US011999581B2

(12) United States Patent
Sasaki et al.

(10) Patent No.: US 11,999,581 B2
(45) Date of Patent: Jun. 4, 2024

(54) RECORDING APPARATUS

(71) Applicant: SEIKO EPSON CORPORATION, Tokyo (JP)

(72) Inventors: Keisuke Sasaki, Matsumoto (JP); Nobuhisa Nomoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 476 days.

(21) Appl. No.: 17/218,507

(22) Filed: Mar. 31, 2021

(65) Prior Publication Data

US 2021/0309472 A1 Oct. 7, 2021

(30) Foreign Application Priority Data

Apr. 3, 2020 (JP) ................................ 2020-067289

(51) Int. Cl.
*B65H 3/06* (2006.01)
*B41J 29/13* (2006.01)
*B65H 7/02* (2006.01)

(52) U.S. Cl.
CPC ............ *B65H 3/0661* (2013.01); *B41J 29/13* (2013.01); *B65H 3/0669* (2013.01); *B65H 7/02* (2013.01); *B65H 2301/5321* (2013.01); *B65H 2402/441* (2013.01)

(58) Field of Classification Search
CPC .......... B65H 3/0661; B65H 7/00; B65H 7/02; B65H 7/20; B65H 2301/531; B65H 2301/5321; B65H 2402/44; B65H 2402/441; B65H 2402/45; B65H 2405/115; B65H 2551/21; B65H 2553/51; B41J 29/13
See application file for complete search history.

(56) References Cited

U.S. PATENT DOCUMENTS

| | | | | |
|---|---|---|---|---|
| 8,360,415 | B1 | 1/2013 | Herrmann et al. | |
| 8,840,107 | B2 | 9/2014 | Umi et al. | |
| 2010/0269859 | A1* | 10/2010 | Brock ...................... | B65H 3/06 134/9 |
| 2013/0293639 | A1 | 11/2013 | Takeuchi et al. | |
| 2014/0077440 | A1 | 3/2014 | Umi et al. | |
| 2015/0344247 | A1* | 12/2015 | Lee .................... | H04N 1/00543 271/117 |
| 2018/0034986 | A1* | 2/2018 | Ishida ................ | H04N 1/00525 |

FOREIGN PATENT DOCUMENTS

| | | | |
|---|---|---|---|
| CN | 1541920 A | * 11/2004 | ........... B65H 3/0669 |
| CN | 103253005 | 8/2013 | |
| CN | 104185556 | 12/2014 | |
| JP | H05-043077 A | 2/1993 | |
| JP | 2014-058352 A | 4/2014 | |
| JP | 2018-016050 A | 2/2018 | |
| JP | 2018-122954 A | 8/2018 | |

* cited by examiner

*Primary Examiner* — Prasad V Gokhale
(74) *Attorney, Agent, or Firm* — WORKMAN NYDEGGER

(57) ABSTRACT

A recording apparatus includes: an apparatus body having an inclined support portion that supports a medium in an inclined position, and a feed roller that feeds the medium supported by the inclined support portion; and an opening/closing body that opens and closes an upper part of the apparatus body. The apparatus body has a cover member that covers an upper part of the feed roller and a vicinity thereof. The cover member has an opening through which the feed roller is exposed.

14 Claims, 10 Drawing Sheets

RECORDING APPARATUS

The present application is based on, and claims priority from JP Application Serial Number 2020-067289, filed Apr. 3, 2020, the disclosure of which is hereby incorporated by reference herein in its entirety.

BACKGROUND

1. Technical Field

The present disclosure relates to a recording apparatus that performs recording on a medium.

2. Related Art

Some printers, which are an example of recording apparatuses, are called multifunction machines. JP-A-2018-016050 discloses a multifunction machine in which a scanner unit is provided on a printer unit. In such a multifunction machine, the scanner unit can be opened and closed relative to the printer unit. By opening the scanner unit to expose the printer unit, an ink tank can be replaced, or a jammed sheet can be removed.

In a state in which the scanner unit is open, a user may accidentally access the inside of the printer unit, or entry of foreign matter into the printer unit is likely to occur. Accordingly, it is desirable to provide a cover member for covering the upper part of the printer unit. However, the printer unit includes a component, namely, a feed roller for feeding sheets, whose performance degrades as foreign matter, such as paper dust and ink mist, are deposited. Hence, providing the cover member inhibits access to the feed roller and, consequently, cleaning of the feed roller.

SUMMARY

According to an aspect of the present disclosure, there is provided a recording apparatus including: an apparatus body having an inclined support portion that supports a medium in an inclined position, and a feed roller that feeds the medium supported by the inclined support portion; and an opening/closing body that opens and closes an upper part of the apparatus body. The apparatus body is provided with, at the upper part thereof, a cover member that partially covers a feeding path for a medium fed out from the inclined support portion, and the cover member has an opening through which the feed roller is exposed.

DESCRIPTION OF EXEMPLARY EMBODIMENTS

Figure 1:
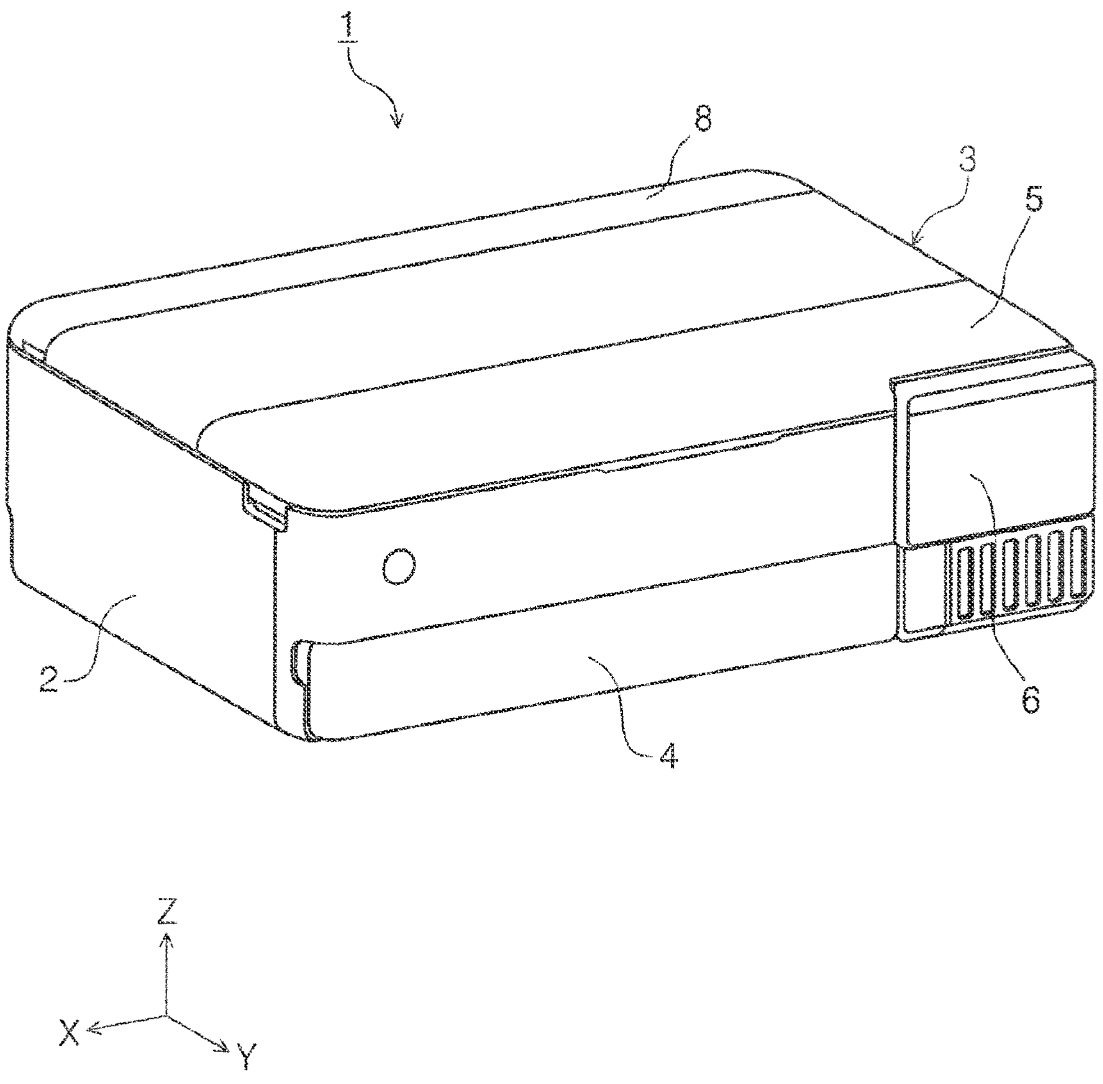
FIG. 1 is a perspective view of a printer with a scanner unit closed, as viewed from the front side.

The outline of the present disclosure will be described below.

A recording apparatus according to the first aspect includes: an apparatus body having an inclined support portion that supports a medium in an inclined position, and a feed roller that feeds the medium supported by the inclined support portion; and an opening/closing body that opens and closes the upper part of the apparatus body. The apparatus body has a cover member that covers the upper part of the feed roller and the vicinity thereof, and the cover member has an opening through which the feed roller is exposed.

With this aspect, because the cover member has the opening through which the feed roller is exposed, it is possible to clean the feed roller through the opening while suppressing entry of foreign matter into the apparatus body.

According to the second aspect, in the first aspect, the opening may have a funnel-shaped.

With this aspect, because the opening has a funnel-shaped, it is possible to guide a cleaning member for cleaning the feed roller to the feed roller located inside the opening. Thus, the efficiency of cleaning the feed roller improves.

According to the third aspect, in the first or second aspect, the opening/closing body may be opened by an angle of at least 35 degrees with respect to the top surface of the cover member.

With this aspect, because the opening/closing body can be opened by an angle of at least 35 degrees with respect to the top surface of the cover member, compared with a case without this structure, it is possible to ensure a workspace in cleaning the feed roller through the opening and thus to improve the efficiency of cleaning the feed roller.

According to the fourth aspect, in the third aspect, the distance between the cover member and the opening/closing body at the center of the opening may be at least 50 mm.

With this aspect, because the distance between the cover member and the opening/closing body at the center of the opening is at least 50 mm, compared with a case without this structure, it is possible to ensure a workspace in cleaning the feed roller through the opening and thus to improve the efficiency of cleaning the feed roller.

According to the fifth aspect, in any one of the first to fourth aspects, the opening/closing body may have a recess at a position facing the apparatus body when the opening/closing body is closed. The recess may be located above the opening when the opening/closing body is open.

With this aspect, because the opening/closing body has the recess at a position facing the apparatus body when the opening/closing body is closed, and the recess is located above the opening when the opening/closing body is open, compared with a case without this structure, it is possible to ensure a workspace in cleaning the feed roller through the opening and thus to improve the efficiency of cleaning the feed roller.

According to the sixth aspect, in any one of the first to fifth aspects, the center of the opening may be located within an area of a rotary shaft of the feed roller in a first direction, which is a direction parallel to the top surface of the cover member and is also a radial direction of the feed roller, and a width of the opening in the first direction may be at least ½ of an outside diameter of the feed roller.

With this aspect, because the center of the opening is located within the area of the rotary shaft of the feed roller in the first direction, and the width of the opening in the first direction is at least ½ of the outside diameter of the feed roller, compared with a case without this structure, the outer circumferential surface of the feed roller is exposed over a wider area, thus making it possible to clean the feed roller more appropriately.

According to the seventh aspect, in any one of the first to sixth aspects, the width of the opening in the width direction of the feed roller may be larger than or equal to the width of the feed roller, so that the entirety of the feed roller in the width direction is exposed through the opening.

With this aspect, because the width of the opening in the width direction of the feed roller is larger than or equal to the width of the feed roller, so that the entirety of the feed roller in the width direction is exposed through the opening, compared with a case without this structure, the outer circumferential surface of the feed roller is exposed over a wider area, thus making it possible to clean the feed roller more appropriately.

According to the eighth aspect, in any one of the first to seventh aspects, the recording apparatus may further include: a carriage that has a recording head for performing recording on a medium and that is movable in a medium width direction; and a main frame that supports the carriage and guides the carriage in the medium width direction. The cover member may be provided adjacent to the main frame.

According to the ninth aspect, in any one of the first to eighth aspects, the recording apparatus may further include: a motor that drives the feed roller; and a control unit that controls the motor. The control unit is configured to perform a cleaning mode in which the feed roller is rotated so as not to touch the medium supported by the inclined support portion.

With this aspect, because the control unit is configured to perform the cleaning mode in which the feed roller is rotated so as not to touch the medium supported by the inclined support portion, compared with a case without this structure, the outer circumferential surface of the feed roller can be easily cleaned over a wider area in the circumferential direction.

According to the tenth aspect, in the ninth aspect, the cleaning mode may include forward rotation and reverse rotation of the feed roller.

With this aspect, because the cleaning mode includes the forward and reverse rotations of the feed roller, compared with a case without this structure, the cleaning efficiency of the feed roller improves.

According to the eleventh aspect, in the ninth or tenth aspect, the recording apparatus may further include: a display that indicates various information; and a detection unit that detects opening of the opening/closing body. The control unit may display, on the display, a user interface suggesting performing the cleaning mode to a user when the opening/closing body is opened with certain conditions satisfied.

With this aspect, because the control unit displays, on the display, the user interface suggesting performing the cleaning mode to a user when the opening/closing body is opened with certain conditions satisfied, compared with a case without this structure, the usability improves.

According to the twelfth aspect, in the ninth or tenth aspect, the recording apparatus may further include a display that indicates various information. The control unit may display, on the display, a user interface suggesting cleaning of the feed roller to a user when the number of medium feed errors from the inclined support portion exceeds a predetermined number.

With this aspect, because the control unit displays, on the display, the user interface suggesting cleaning of the feed roller to a user when the number of medium feed errors from the inclined support portion exceeds a predetermined number, compared with a case without this structure, the performance of the feed roller may be quickly recovered by the user.

The present disclosure will be described in detail below.

An ink jet printer 1, serving as an example of a recording apparatus, will be described below. The ink jet printer 1 will be simply called a printer 1.

In the X-Y-Z coordinate system shown in the respective drawings, the X-axis direction is the rotation-axis direction of a feed roller 13 (see FIGS. 3 and 4) and the width direction of a medium to be transported and subjected to recording. The X-axis direction is also the apparatus width direction, and, when a user faces the front side of the printer 1, the +X side is the left side, and the −X side is the right side as viewed from the user.

The Y-axis direction is the apparatus depth direction, in which the medium is transported during recording. The +Y direction is oriented from the rear side toward the front side of the apparatus, and the −Y direction is oriented from the front side toward the rear side of the apparatus. In this embodiment, among the side surfaces constituting the exterior of the printer 1, the side surface having an operation panel 6 is the front side of the apparatus.

The Z-axis direction is the vertical direction and is the apparatus height direction. The +Z direction is the vertically upward direction, and the −Z direction is the vertically downward direction.

Herein, the direction in which a medium is transported may be referred to as “downstream”, and the direction opposite thereto may be referred to as “upstream”.

Figure 2:
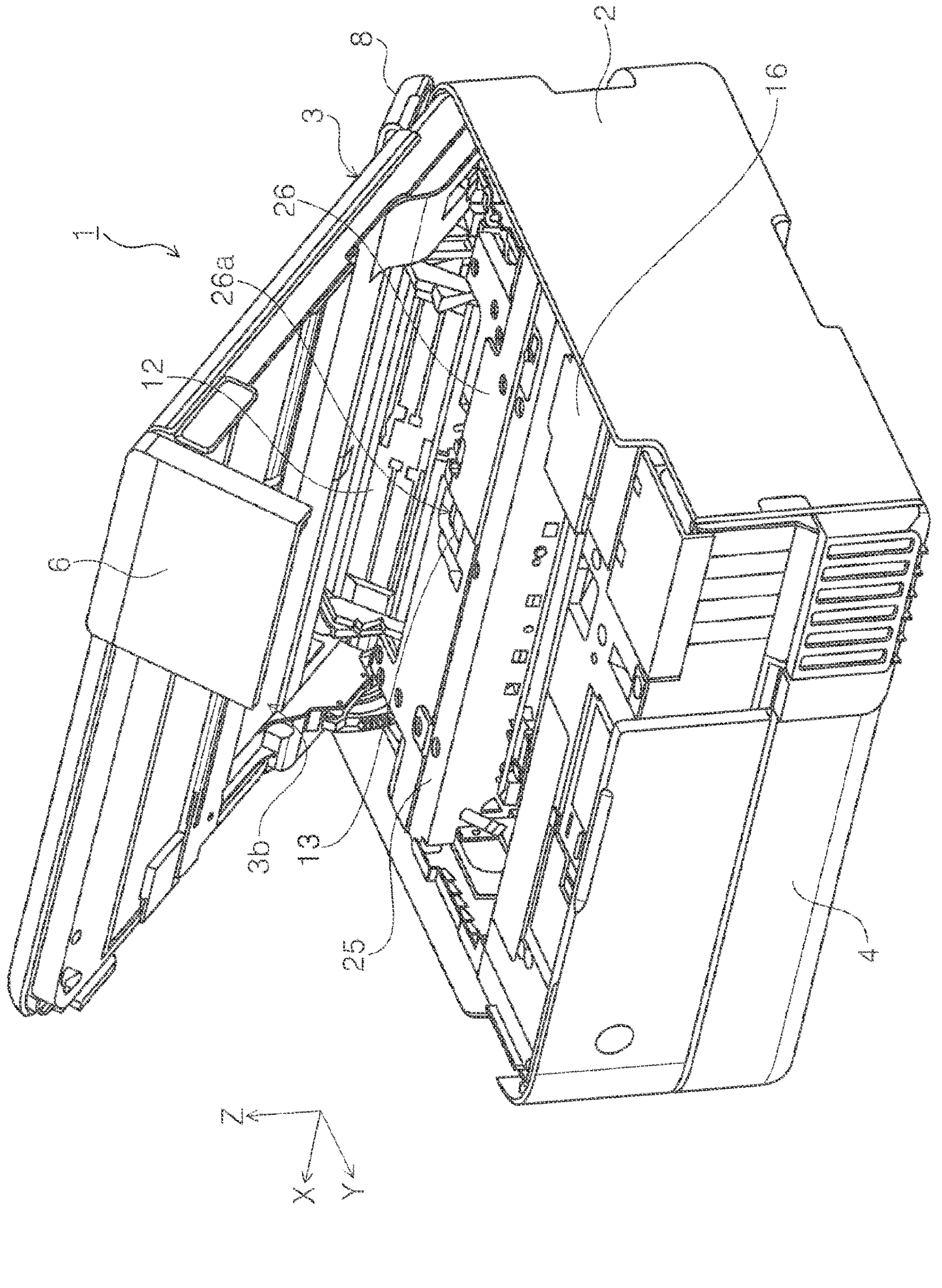
FIG. 2 is a perspective view of the printer with the scanner unit open, as viewed from the front side.

First, the outline of the overall structure of the printer 1 will be described. In FIGS. 1 and 2, the printer 1 is configured as a multifunction machine having both an ink jet recording function and a document reading function and includes: an apparatus body 2, which performs ink jet recording on a medium, such as a recording sheet; and a scanner unit 3, serving as an example of an opening/closing body, disposed on the apparatus body 2.

Figure 3:
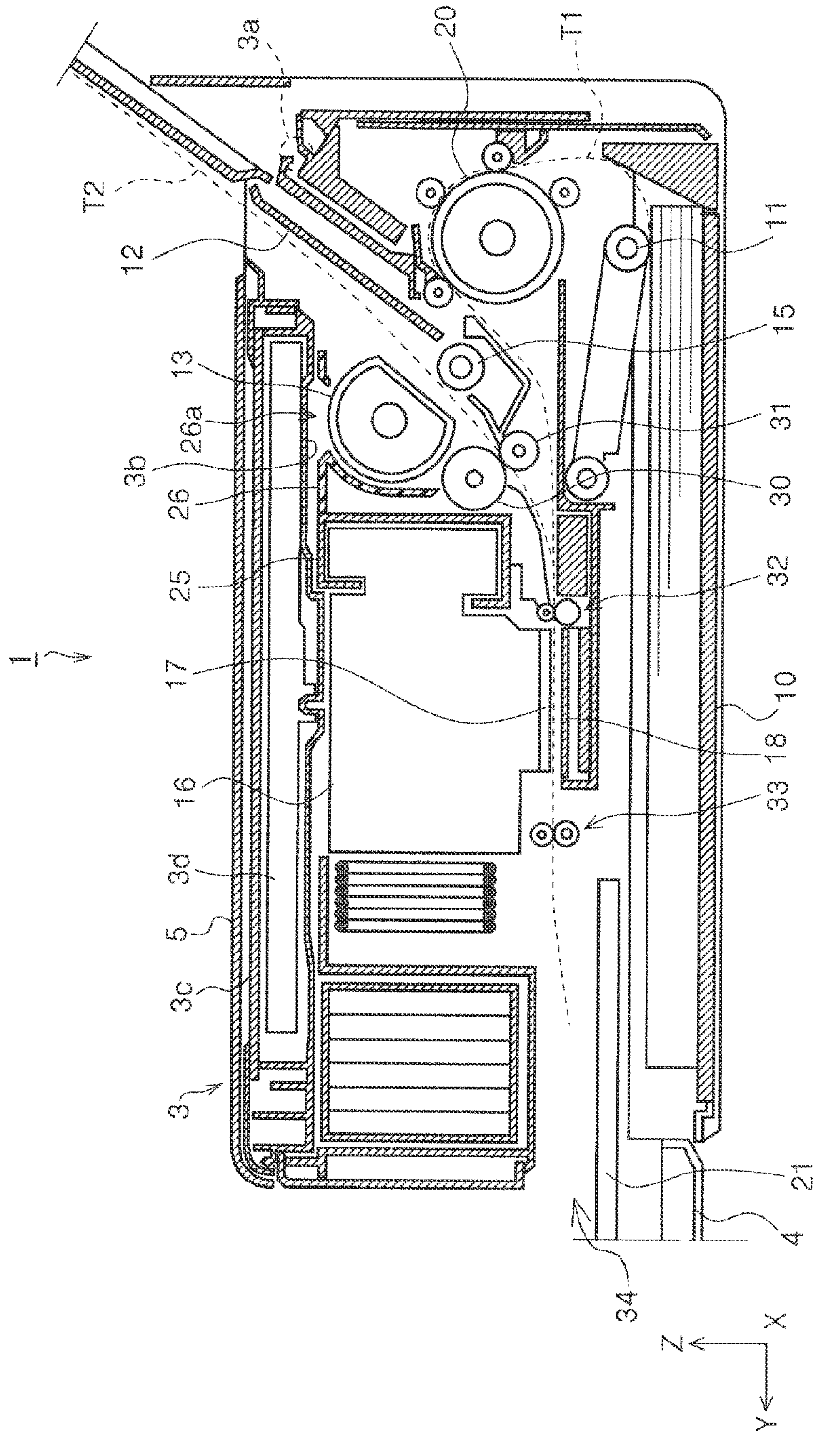
FIG. 3 is a sectional view of the printer with the scanner unit closed, taken along a Y-Z plane.
Figure 4:
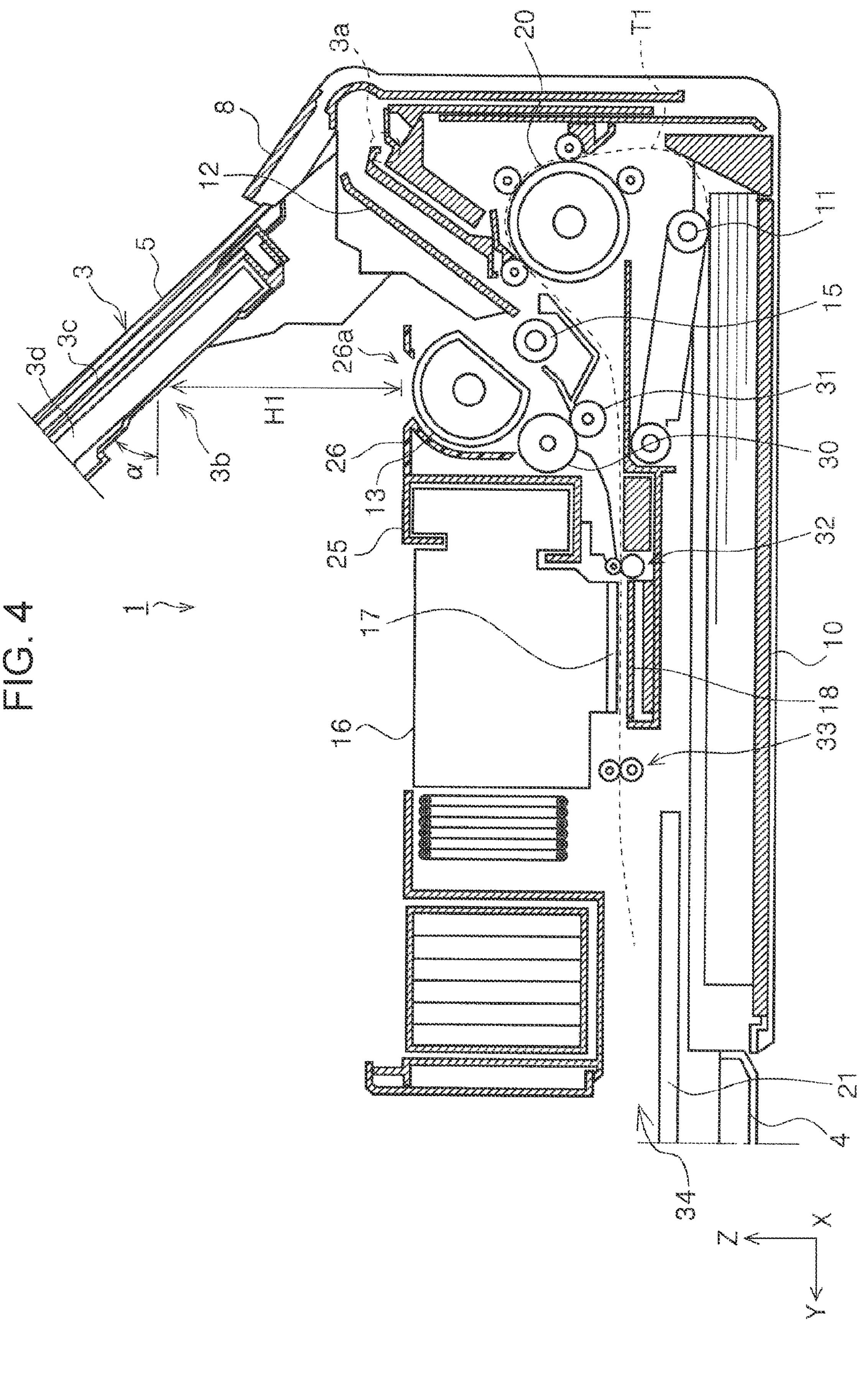
FIG. 4 is a sectional view of the printer with the scanner unit open, taken along the Y-Z plane.

The scanner unit 3 is pivotable about a rotary shaft 3*a* (see FIGS. 3 and 4) relative to the apparatus body 2 to open and close the upper part of the apparatus body 2 as it pivots. In this embodiment, the rotation axis of the scanner unit 3 is parallel to the X-axis direction. FIGS. 1 and 3 show a state in which the scanner unit 3 is closed, and FIGS. 2 and 4 show a state in which the scanner unit 3 is open. FIGS. 2 and 4 show a state in which the scanner unit 3 is fully open, that is, a fully open state. The fully open state of the scanner unit 3 is maintained by an orientation holding unit (not shown). The orientation holding unit may be, for example, a known torque hinge or the like.

The scanner unit 3 has a document cover 5 that opens and closes a document bed 3*c* (see FIG. 3). In the scanner unit 3, a reading portion 3*d* (see FIG. 3) for reading a document is provided below the document bed 3*c*. The reading portion 3*d* extends in the Y-axis direction and reads a document disposed on the document bed 3*c* while moving in the X-axis direction by receiving power from a motor (not shown).

The apparatus body 2 has, on the front side of the apparatus, the operation panel 6 including an operation portion, via which various operation settings are done, and a display that indicates the details of print settings and a preview image of an image to be printed. In this embodiment, the operation panel 6 is provided integrally with the scanner unit 3 and thus is pivoted with the scanner unit 3, as shown in FIG. 2.

A front-side cover 4 is provided on the front side of the apparatus. By opening the front-side cover 4, a medium cassette 10, a medium discharge port 34, a medium receiving tray 21, etc., shown in FIGS. 3 and 4 are exposed.

A top cover 8 is provided on the upper surface, on the rear side, of the apparatus. By opening the top cover 8, an inclined support portion 12 shown in FIGS. 2 and 3 is exposed. The inclined support portion 12 supports, in an inclined position, a medium to be fed.

Referring to FIG. 3, a medium transport path in the printer 1 will be described. As shown in FIG. 3, the printer 1 has two medium transport paths, namely, a medium transport path T1 that is used when a medium is transported from the medium cassette 10 at the bottom of the apparatus, and a medium transport path T2 that is used when a medium is transported from the upper part on the rear side of the apparatus. Although the medium transport paths are formed of path forming members, detailed descriptions thereof will be omitted.

In the medium transport path T1, a medium is fed out from the medium cassette 10 by a pick-up roller 11, is reversed by a reversing roller 20, and is transported toward a transport roller pair 32.

In the medium transport path T2, a medium supported in an inclined position by the inclined support portion 12 is fed toward a transport roller 30 and a nip roller 31 by the feed roller 13. The feed roller 13 is driven by a feed motor 52 (see FIG. 10), and the transport roller 30 is driven by a transport motor 53 (see FIG. 10). The transport roller 30 may be driven by the feed motor 52. The nip roller 31 can be rotated in a driven manner.

The medium supported by the inclined support portion 12 is transported toward the transport roller pair 32 by the transport roller 30 and the nip roller 31.

Figure 10:
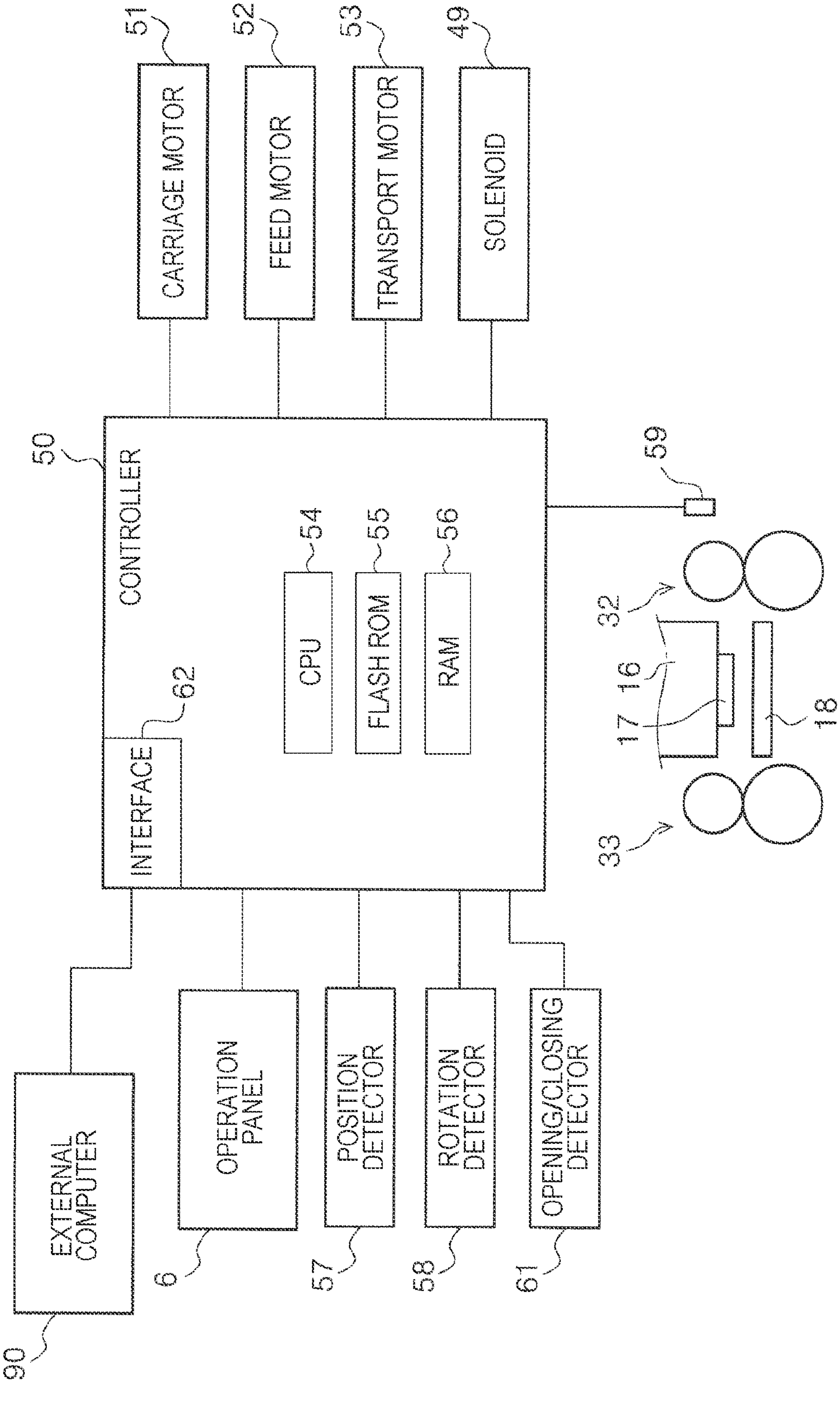
FIG. 10 is a block diagram showing the control system of the printer.

The transport roller pair 32 transports the medium to a position facing a recording head 17 by receiving power from the transport motor 53 (see FIG. 10).

A medium support portion 18 is provided at a position facing the recording head 17 and defines the gap between the recording head 17 and the medium by supporting the medium.

A carriage 16 having the recording head 17 is movable in the medium width direction. The carriage 16 moves in the medium width direction by receiving power from the carriage motor 51 (see FIG. 10).

A main frame 25 supports the carriage 16 and guides the carriage 16 in the X-axis direction. In this embodiment, the main frame 25 is made of a metal and, as shown in FIG. 2, divides the inside of the apparatus body 2 into a +Y side area and a −Y side area.

A discharging roller pair 33 is provided downstream of the recording head 17 and the medium support portion 18. The medium that has been subjected to recording is discharged outside the apparatus by the discharging roller pair 33 and is supported by the medium receiving tray 21. The discharging roller pair 33 is driven by the transport motor 53 (see FIG. 10).

Next, referring to FIG. 10, a control system in the printer 1 will be described.

A controller 50, serving as a control unit, controls feeding, transporting, discharging, and recording of a medium and various other operations of the printer 1. Although FIG. 10 is a block diagram focusing on the recording function for performing recording on a medium, the controller 50 also controls various operations of the scanner unit 3 (the description thereof will be omitted, though).

The controller 50 receives signals from the operation panel 6 and transmits, to the operation panel 6, signals for performing indication, more specifically, a user interface (hereinbelow, "UI"), on the operation panel 6.

The controller 50 controls the carriage motor 51, the feed motor 52, and the transport motor 53, which are involved in a medium transport operation and a recording operation. In this embodiment, these motors are DC motors.

The controller 50 also receives detection signals from a position detector 57, a rotation detector 58, a medium detector 59, and an opening/closing detector 61.

The position detector 57 is a linear encoder and detects the position of the carriage 16 in the X-axis direction. The rotation detector 58 is a rotary encoder and detects the degree of rotation and rotation speed of the rollers driven by the transport motor 53.

The opening/closing detector 61 detects whether the scanner unit 3 is open or closed. The opening/closing detector 61 may be a contact or non-contact sensor. The opening/closing detector 61 may detect whether the scanner unit 3 is fully closed or is in another state, that is, is open to any extent. Alternatively, the opening/closing detector 61 may be combined with a plurality of sensors to detect the state of the scanner unit 3 from at least three states, i.e., a state in which the scanner unit 3 is fully closed, a state in which the scanner unit 3 is fully open, and a state in which the scanner unit 3 is in a state therebetween. Alternatively, the opening/closing detector 61 may use a rotary encoder or the like to detect the rotation angle of the scanner unit 3 to detect the open/close state based on the detected angle.

The medium detector 59 is provided near and upstream of the transport roller pair 32 and detects whether the leading end and the trailing end of a medium has passed. The medium detector 59 may be a contact or non-contact sensor. The controller 50 can grasp whether a medium has been properly fed out from the medium cassette 10 or the inclined support portion 12, more specifically, whether non-feeding has occurred, on the basis of the detection information from the medium detector 59.

The controller 50 includes a central processing unit (CPU) 54, a flash read-only memory (ROM) 55, and a random-access memory (RAM) 56. The CPU 54 performs various arithmetic processing according to the programs stored in the flash ROM 55 to control the overall operation of the printer 1. The flash ROM 55, which is an example of a storage unit, is a non-volatile memory from which information is read and into which information is written. The various setting information input from a user through the operation panel 6 is also stored in the flash ROM 55. The RAM 56, which is an example of a storage unit, temporarily stores various information.

The controller 50 has an interface 62, via which communication with an external computer 90 is possible.

Next, the feed roller 13, which feeds a medium supported by the inclined support portion 12, and the peripheral configurations thereof will be described in more detail.

As shown in FIGS. 3 and 4, the feed roller 13 has a flat portion on the outer circumferential surface thereof. More specifically, the feed roller 13 has an arc-shaped portion and a flat portion, and the arc-shaped portion comes into contact with a medium to apply a transport force thereto. After a feed operation for feeding out a medium from the inclined support portion 12 is completed, as shown in FIGS. 3 and 4, the flat portion of the feed roller 13 is maintained to face the inclined support portion 12.

Figure 6:
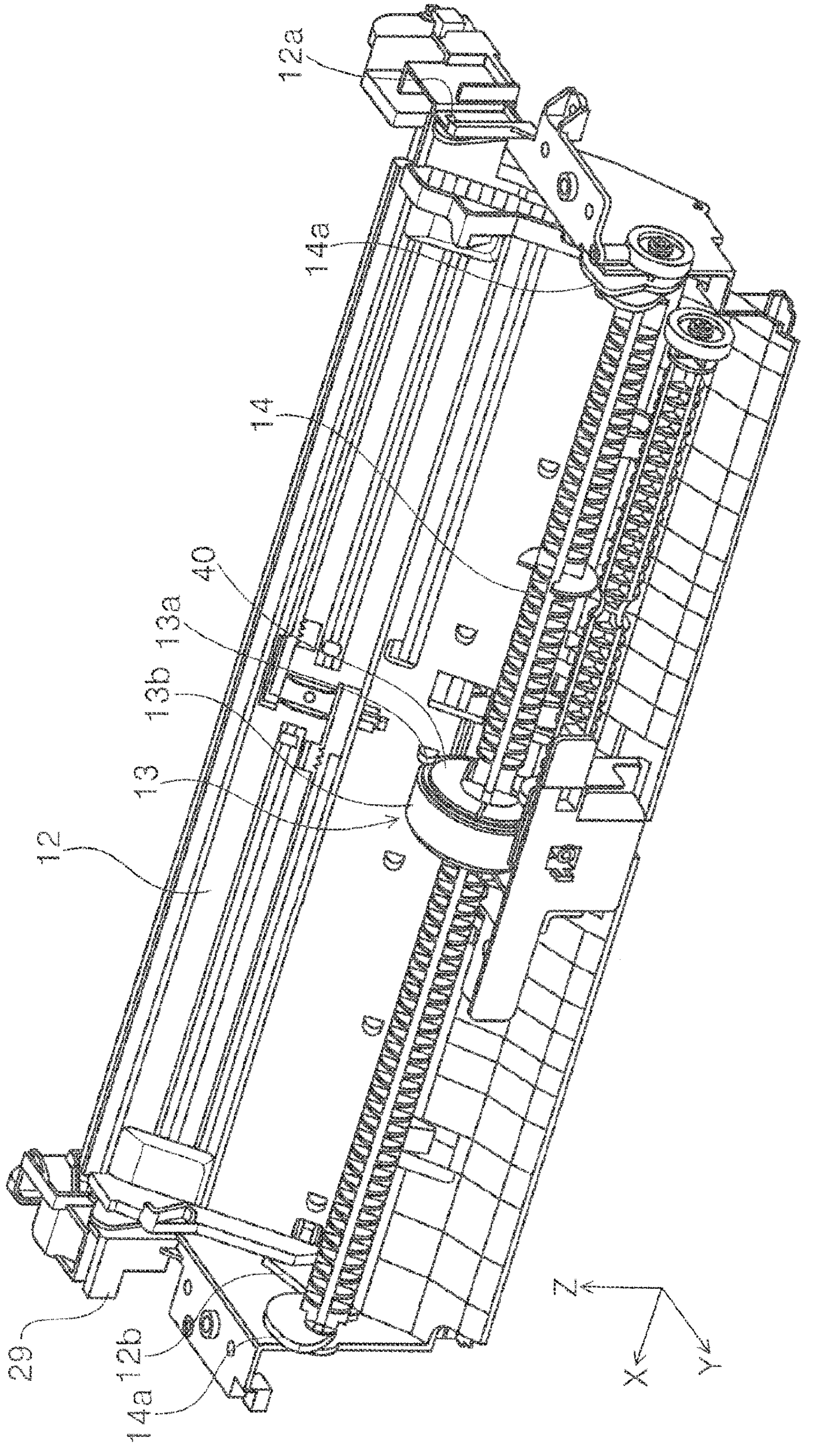
FIG. 6 is a perspective view of a sheet feed frame, a feed roller, and a rotary shaft provided on the rear side of the apparatus.

As shown in FIG. 6, the feed roller 13 has a high-friction member 13*b*, which is made of rubber or elastomer, on the outer circumference of a body 13*a*. The body 13*a* is formed integrally with a rotary shaft 14. In this embodiment, the rotary shaft 14 and the body 13*a* are made of resin.

The rotary shaft 14 is rotatably supported by a sheet feed frame 29 and includes cams 14*a* at the ends thereof. The inclined support portion 12 is rotatably supported by the sheet feed frame 29 via rotary shafts 12*a*. Although FIG. 6 shows the rotary shaft 12*a* provided at the −X-side end of the inclined support portion 12, the same rotary shaft 12*a* is provided also at the +X-side end of the inclined support portion 12 and is supported by the sheet feed frame 29. The rotation axis of the inclined support portion 12 is parallel to the X-axis direction.

The inclined support portion 12 has cam followers 12*b*, which can engage with the cams 14*a*, at positions facing the cams 14*a* of the rotary shaft 14. Although FIG. 6 shows the cam follower 12*b* provided at the +X-side end of the inclined support portion 12, the same cam follower 12*b* is provided also at the −X-side end of the inclined support portion 12 so as to be engaged with the corresponding cam 14*a*.

The cam followers 12*b* of the inclined support portion 12 are urged toward the cams 14*a* by urging members (not shown), such as compression springs. In other words, the inclined support portion 12 is urged by the urging members in a direction in which the medium supported thereon is urged against the feed roller 13. When the rotary shaft 14 rotates, the cams 14*a* push the cam followers 12*b* downward, separating the medium supported by the inclined support portion 12 from the feed roller 13, or when the rotary shaft 14 rotates, the cams 14*a* stop pushing the cam followers 12*b* downward, allowing the medium supported by the inclined support portion 12 to come into contact with the feed roller 13.

In this structure, because the cams 14*a* and the cam followers 12*b* are provided at the ends in the X-axis direction, inclination or twisting of the inclined support portion 12 is suppressed.

In this embodiment, a solenoid 49 (see FIG. 10) in which a plunger (not shown) moves into and away from the rotation area of the inclined support portion 12 is provided. The solenoid 49 switches between a restricted state, in which the plunger has advanced into the rotation area of the inclined support portion 12 to restrict the rotation of the inclined support portion 12 toward the feed roller 13, and an allowance state, in which the plunger is retracted from the rotation area of the inclined support portion 12 to allow the rotation of the inclined support portion 12. This structure allows the feed roller 13 to be freely rotated so as not to touch the medium supported by the inclined support portion 12.

Sheet-like static eliminators 40 are provided on the side surfaces of the body 13*a* of the feed roller 13. The static eliminators 40 are made of a known material, such as nonwoven fabric, capable of eliminating static electricity. Although FIG. 6 shows the static eliminator 40 provided on the −X-side surface of the body 13*a*, the same static eliminator 40 is provided also on the +X-side surface of the body 13*a*. By providing the static eliminators 40 on the feed roller 13, attachment of ink mist, paper dust, etc., to the feed roller 13 is suppressed. The static eliminators 40 may be brought into electrical contact with a conducting member, such as a metal frame constituting the apparatus body 2, so as to be grounded.

Figure 7:
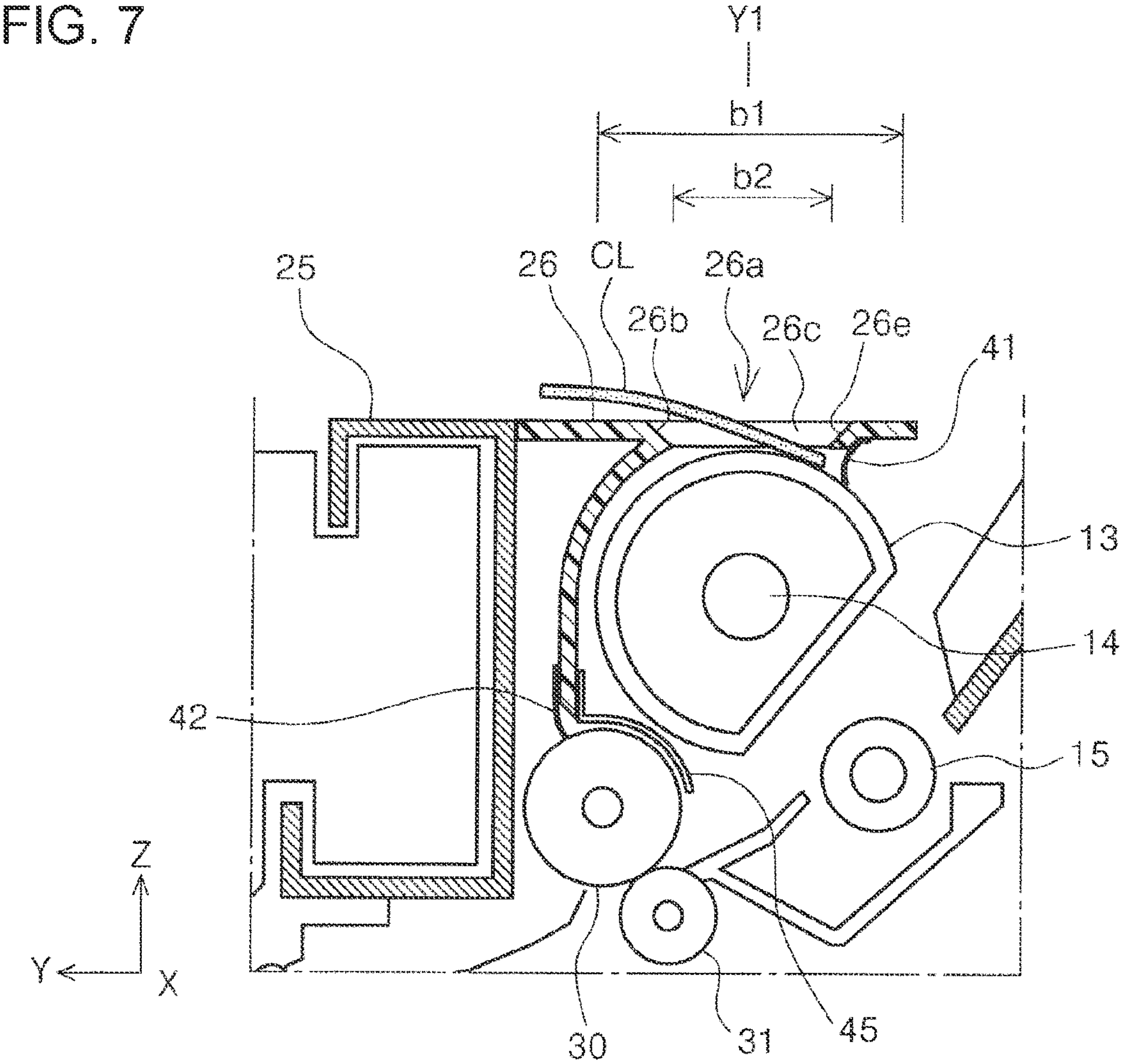
FIG. 7 is a partial enlarged view of FIG. 4.

These static eliminators may also be provided so as to be in contact with the outer circumferential surfaces of rollers, as shown in FIG. 7. FIG. 7 shows a static eliminator 41 that is in contact with the outer circumferential surface of the feed roller 13, and a static eliminator 42 that is in contact with the outer circumferential surface of the transport roller 30. In this embodiment, the static eliminators 41 and 42 are attached to a cover member 26 (described below). The static eliminators 41 and 42 may be made of the same material as the static eliminators 40. The static eliminators 41 and 42 may also be brought into electrical contact with a conducting member, such as a metal frame or the like constituting the apparatus body 2, so as to be grounded. These static eliminators suppress attachment of ink mist, paper dust, etc., to the rollers.

A cover member 45 that partially covers the outer circumferential surface of the transport roller 30 is provided above the transport roller 30 so as to divide the area for the transport roller 30 and the area for the feed roller 13. Ink mist generated by discharge of ink from the recording head 17 is more likely to be attached to the transport roller 30 than to the feed roller 13, and, when the transport roller 30 rotates, the ink mist is likely to flow toward the feed roller 13. However, providing the cover member 45 suppresses flow of the ink mist from the transport roller 30 toward the feed roller 13.

Next, the cover member 26 that covers the upper part of the area on the −Y side of the main frame 25, more specifically, the upper part of the feed roller 13 and the vicinity thereof, will be described. As shown in FIG. 2, the cover member 26 is provided on the −Y side of the main frame 25 so as to be adjacent to the main frame 25. In this embodiment, the cover member 26 is made of resin and is fixed to the sheet feed frame 29 (see FIG. 6). In this embodiment, the sheet feed frame 29 is also made of resin.

As shown in FIGS. 3 to 5, 7, and 8, the cover member 26 covers the upper part of the feed roller 13 and the vicinity thereof, more specifically, covers a portion of a medium transport path T2, serving as a transport path for a medium fed out from the inclined support portion 12, to suppress the entry of dust etc. into the apparatus body 2.

Figure 5:
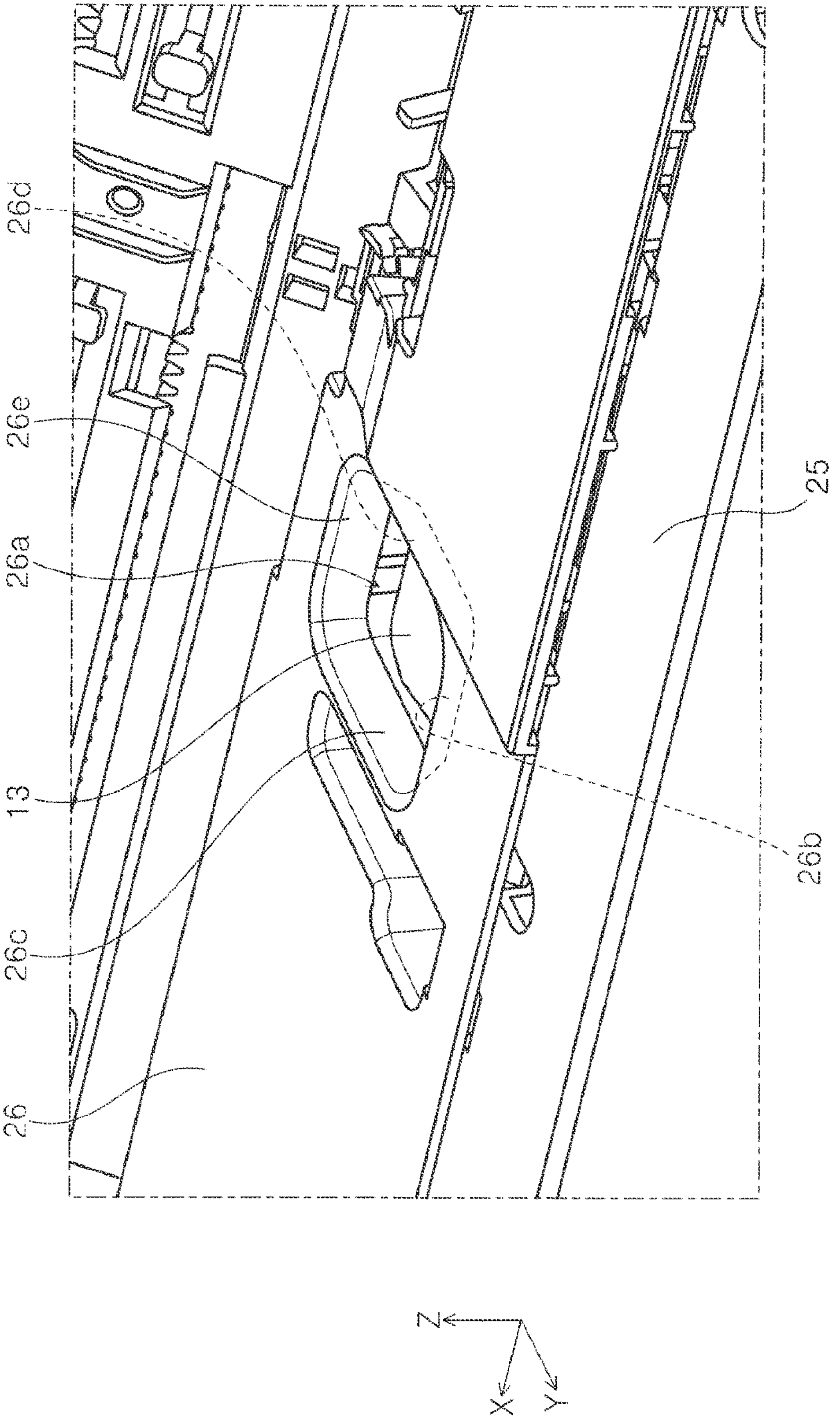
FIG. 5 is a partial enlarged view of FIG. 2.

As shown in an enlarged manner in FIGS. 5 and 7, the cover member 26 has an opening 26*a* through which the feed roller 13 is exposed. Because the cover member 26 has the opening 26*a* through which the feed roller 13 is exposed, it is possible to clean the feed roller 13 through the opening 26*a*, while suppressing entry of foreign matter into the apparatus body 2.

In this embodiment, the opening 26*a* has a funnel-shaped. FIG. 5 shows slopes 26*b*, 26*c*, 26*d*, and 26*e* constituting the edges of the opening 26*a*. The slopes 26*b*, 26*c*, 26*d*, and 26*e* are inclined downward toward the center of the opening 26*a*. Because the opening 26*a* has a funnel-shaped, it is possible to guide a cleaning member CL (see FIG. 7) for cleaning the feed roller 13 to the feed roller 13 located inside the opening 26*a* and, thus, to improve the efficiency of cleaning the feed roller 13. The cleaning member CL may be anything, such as a fiber sheet, that can be used to clean the outer circumferential surface of the feed roller 13.

In this embodiment, the scanner unit 3 can be opened by an angle of at least 35 degrees with respect to the top surface of the cover member 26. The reference sign α in FIG. 4 represents the opening angle of the scanner unit 3. When the scanner unit 3 is fully closed, the opening angle α is 0 degrees, and, when the scanner unit 3 is fully open, the opening angle α is 35 degrees or more, and more specifically, 45 degrees. The opening angle α may be, for example, the angle between the document mounting surface of the document bed 3*c* and the top surface of the cover member 26.

Because the scanner unit 3 can be widely opened, it is possible to ensure a workspace in cleaning the feed roller 13 through the opening 26*a* and, thus, to improve the efficiency of cleaning the feed roller 13.

The distance H1 between the cover member 26 and the scanner unit 3 at the center of the opening 26*a* is at least 50 mm. More specifically, in this embodiment, the distance H1 is set to 75 mm. Herein, the center of the opening 26*a* is the center of the opening 26*a* in the Y-axis direction. The distance H1 is the distance, in the Z-axis direction, between the top surface of the cover member 26 and the bottom surface of the scanner unit 3 in a fully open state. In this embodiment, the top surface of the cover member 26 is horizontal.

With this structure, it is possible to ensure a workspace in cleaning the feed roller 13 through the opening 26*a* and, thus, to improve the efficiency of cleaning the feed roller 13.

Furthermore, as shown in FIG. 3, the scanner unit 3 has a recess 3*b* at a position facing the apparatus body 2 in the closed state. As shown in FIG. 4, the recess 3*b* is located above the opening 26*a* when the scanner unit 3 is open. With this structure, it is possible to ensure a workspace in cleaning the feed roller 13 through the opening 26*a* and, thus, to improve the efficiency of cleaning the feed roller 13.

As shown in FIG. 7, in this embodiment, the center Y1 of the opening 26*a* is located within the area of the rotary shaft 14 of the feed roller 13 in a first direction, which is a direction parallel to the top surface of the cover member 26 and is a radial direction of the feed roller 13, i.e., the Y-axis direction. In other words, the opening 26*a* is centered with respect to the feed roller 13. The width b2 of the opening 26*a* in the Y-axis direction is at least ½ of the outside diameter b1 of the feed roller 13. With this structure, a wide area of the outer circumferential surface of the feed roller 13 is exposed through the opening 26*a*, enabling the feed roller 13 to be cleaned more appropriately.

Although it is more desirable that the center Y1 of the opening 26*a* be aligned with the axial center of the rotary shaft 14 of the feed roller 13 in the Y-axis direction, the center Y1 may be misaligned with the axial center of the rotary shaft 14, as long as the center Y1 is located within the area of the rotary shaft 14.

Figure 8:
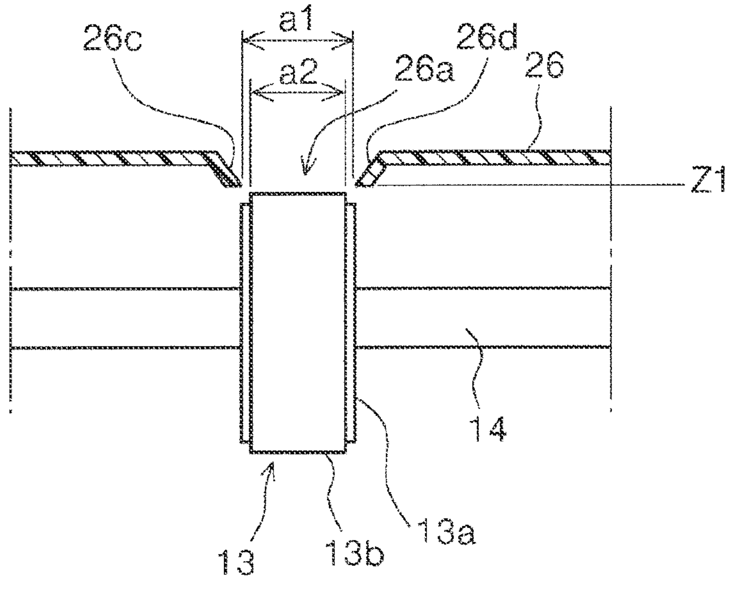
FIG. 8 is a sectional view of an opening in a cover member, taken along an X-Z plane.

As shown in FIG. 8, in this embodiment, the width a1 of the opening 26*a* in the width direction of the feed roller 13, i.e., the X-axis direction, is greater than or equal to the width a2 of the feed roller 13, so, the entirety of the feed roller 13 in the width direction is exposed through the opening 26*a*. With this structure, it is possible to clean the feed roller 13 more appropriately.

In this embodiment, although the outer circumferential surface of the feed roller 13 is located below the lower-end position Z1 of the edge of the opening 26*a*, the outer circumferential surface of the feed roller 13 may be located above the lower-end position Z1. With such a structure, the outer circumferential surface of the feed roller 13 is exposed more thoroughly, and thus, it is possible to clean the outer circumferential surface of the feed roller 13 more easily.

Figure 9:
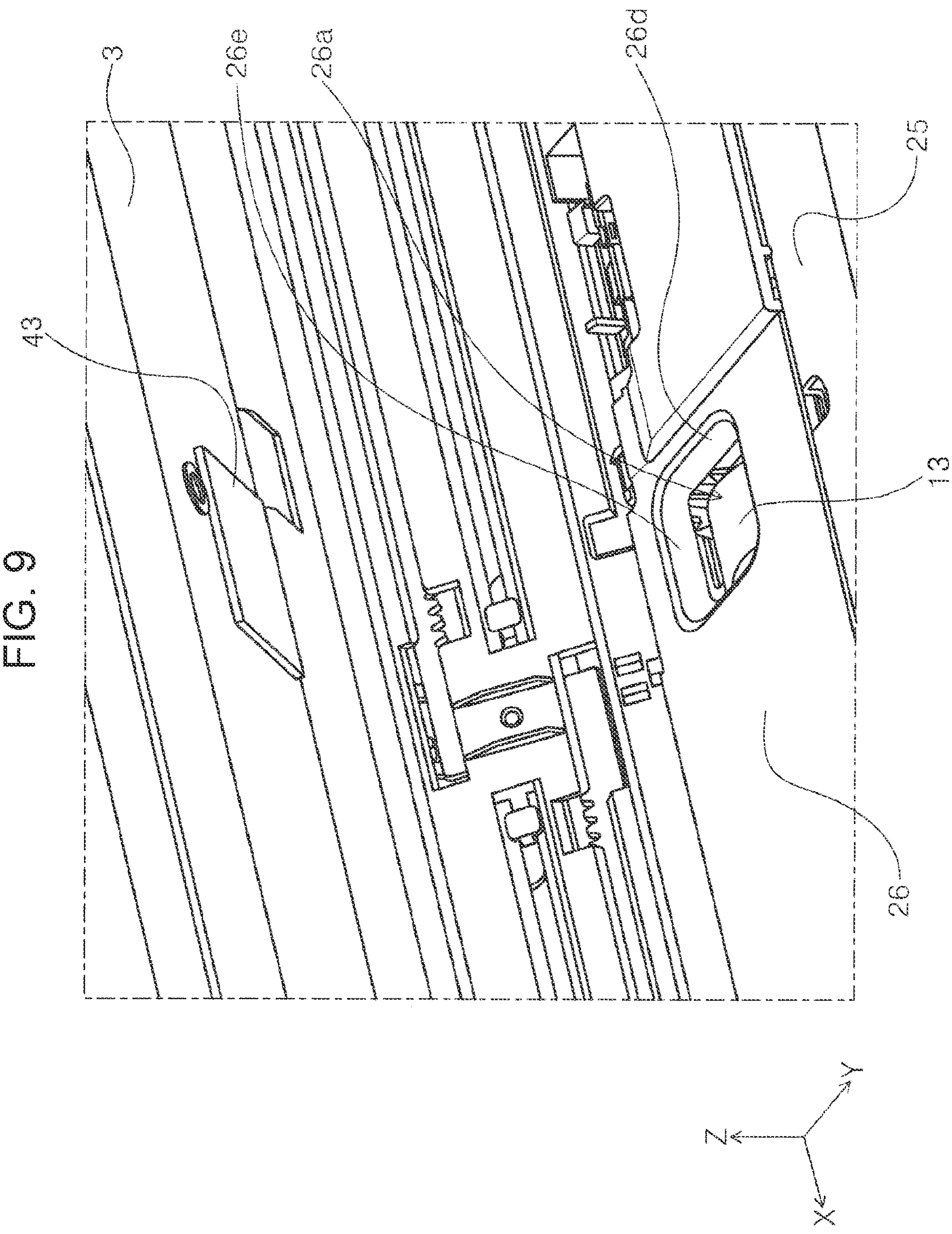
FIG. 9 is a perspective view of a static eliminator provided on the bottom surface of the scanner unit.

As shown in FIG. 9, a static eliminator 43 may be provided on the bottom surface of the scanner unit 3, at a position facing the opening 26*a*, so as to fully or partially cover the opening 26*a* when the scanner unit 3 is closed. With this structure, it is possible to inhibit the ink mist from flowing out of the apparatus body 2 through the opening 26*a*.

Figure 11:
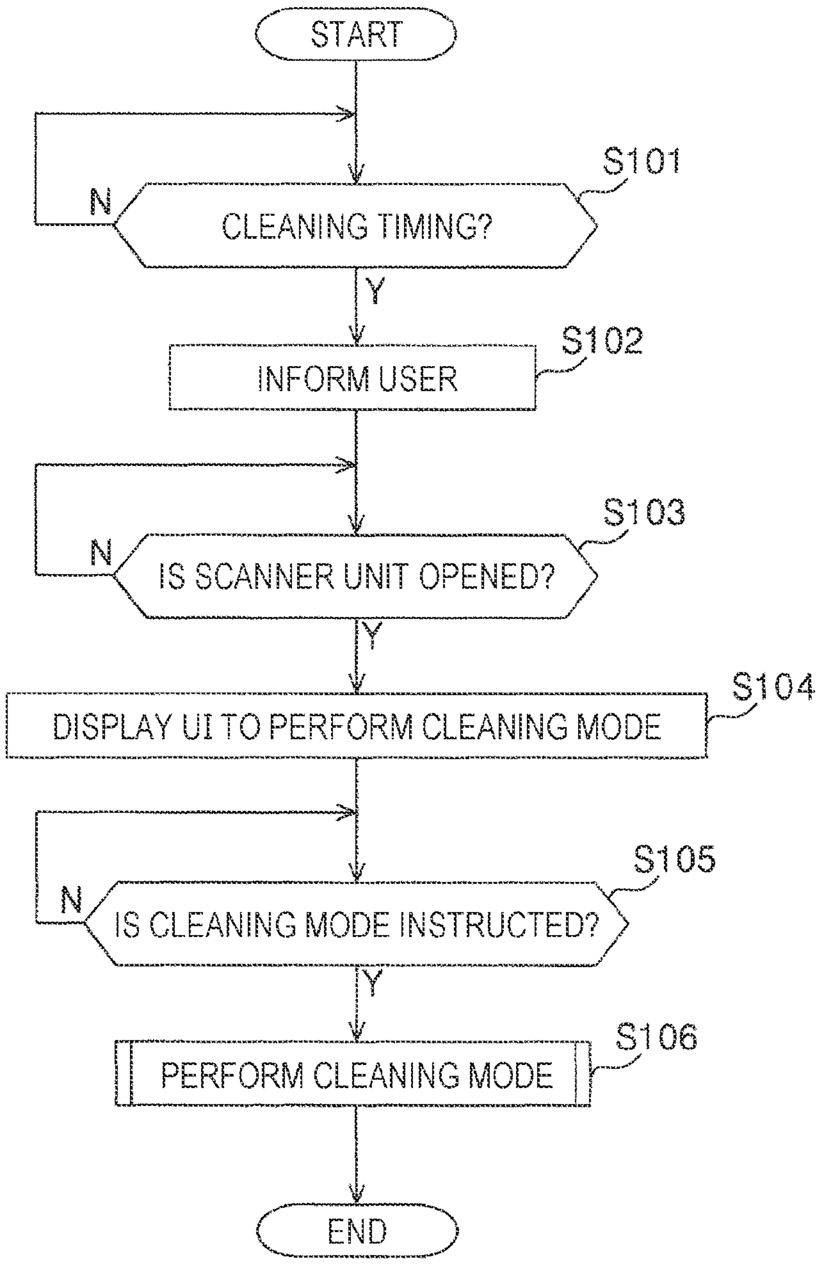
FIG. 11 is a flowchart showing an example of the control performed by the controller.

Referring to FIG. 11, the control performed by the controller 50 will be described.

When the controller 50 determines that the timing for cleaning the feed roller 13 has come (Yes in step S101), the controller 50 notifies a user of that effect (step S102). The notification to the user may be performed by displaying a message, such as "open the scanner unit to clean the feed roller", on the operation panel 6 (see FIGS. 1 and 2).

The timing for cleaning the feed roller 13 may be set to one or both of (1) and (2) below: (1) when the number of medium non-feeding errors from the inclined support portion 12 has exceeded a predetermined number; and (2) when the number of media fed out from the inclined support portion 12 after the previous cleaning (step S106) has exceeded a predetermined number. Note that the medium non-feeding is a phenomenon in which a medium is not fed out from the inclined support portion 12 and stays thereon regardless of the rotation of the feed roller 13, and is an example of a medium feed error from the inclined support portion 12.

The cleaning mode (step S106) will be described below.

Next, when the controller 50 detects that the scanner unit 3 is opened (Yes in step S103), the controller 50 displays, on the operation panel 6, a UI suggesting performing a cleaning mode to a user (step S104). The UI may be a message, such as "rotate feed roller for cleaning? (Yes/No)".

When the user selects "Yes" to the UI (Yes in step S105), the controller 50 performs the cleaning mode (step S106).

In the cleaning mode (step S106), the feed roller 13 is rotated so as not to touch the medium supported by the inclined support portion 12. The controller 50, by controlling the solenoid 49 (see FIG. 10), maintains a state in which the inclined support portion 12 is maximally separated from the feed roller 13 and causes the feed roller 13 to rotate in that state.

It is more desirable that the feed roller 13 be rotated at a lower speed than the rotation speed when feeding the medium. The rotation of the feed roller 13 may include forward rotation and reverse rotation. In the forward and reverse rotations of the feed roller 13, for example, the feed roller 13 may be rotated in the forward direction continuously by one or more cycles and then in the reverse direction by the same number of cycles, or may be rotated in the forward or reverse direction by one or more cycles so as to frequently repeat the forward and reverse rotations.

As described above, because the controller 50 can perform the cleaning mode in which the feed roller 13 is rotated so as not to touch the medium supported by the inclined support portion 12, the user can easily clean a wide area of the outer circumferential surface of the feed roller 13 in the circumferential direction of the feed roller 13.

By rotating the feed roller 13 in the forward and reverse directions during the cleaning mode, the cleaning efficiency of the feed roller 13 is improved.

Because the controller 50 displays, on the operation panel 6, a UI suggesting cleaning of the feed roller 13 to the user when the number of medium non-feeding errors from the inclined support portion 12 has exceeded a predetermined number (steps S101 and S102), the user may be able to recover the performance of the feed roller 13 quickly.

When the scanner unit 3 is opened with certain conditions satisfied (step S101), the controller 50 displays, on the operation panel 6, a UI suggesting performing the cleaning mode to the user (step S104). Thus, the user does not need to reach the UI displayed on the operation panel 6 from, for example, the main menu, and the usability in performing the cleaning mode improves.

The present disclosure is not limited to the above-described embodiment, but may be variously modified within the scope described in the claims, and such modifications are of course included in the present disclosure.

For example, although the opening/closing body provided on the upper part of the apparatus body 2 is the scanner unit 3 in the above-described embodiment, the opening/closing body is not limited to the scanner unit 3, but may be a cover or the like.

What is claimed is:

1. A recording apparatus comprising:
an apparatus body having an inclined support portion that supports a medium in an inclined position, and a feed roller that feeds the medium supported by the inclined support portion;
a static eliminator; and
an opening/closing body that opens and closes an upper part of the apparatus body, wherein
the apparatus body has a cover member that covers an upper part of the feed roller and a vicinity thereof,
the cover member has an opening through which the feed roller is exposed, and
the static eliminator is at a position facing the opening.

2. The recording apparatus according to claim 1, wherein the opening has a funnel-shaped.

3. The recording apparatus according to claim 1, wherein the opening/closing body is configured to be opened by an angle of at least 35 degrees with respect to a top surface of the cover member.

4. The recording apparatus according to claim 3, wherein a distance between the cover member and the opening/closing body at a center of the opening is at least 50 mm.

5. The recording apparatus according to claim 1, wherein
the opening/closing body has a recess at a position facing the apparatus body when the opening/closing body is closed, and
the recess is located above the opening when the opening/closing body is open.

6. The recording apparatus according to claim 1, wherein
a center of the opening is located within an area of a rotary shaft of the feed roller in a first direction, which is a direction parallel to a top surface of the cover member and is also a radial direction of the feed roller, and
a width of the opening in the first direction is at least ½ of an outside diameter of the feed roller.

7. The recording apparatus according to claim 1, wherein
a width of the opening in a width direction of the feed roller is larger than or equal to a width of the feed roller, so that an entirety of the feed roller in the width direction is exposed through the opening.

8. The recording apparatus according to claim 1, further comprising:
a carriage that has a recording head for performing recording on a medium and that is movable in a medium width direction; and
a main frame that supports the carriage and guides the carriage in the medium width direction,
wherein the cover member is provided adjacent to the main frame.

9. The recording apparatus according to claim 1, further comprising:
a motor that drives the feed roller; and
a control unit that controls the motor,
wherein the control unit is configured to perform a cleaning mode in which the feed roller is rotated so as not to touch the medium supported by the inclined support portion.

10. The recording apparatus according to claim 9, wherein the cleaning mode includes forward rotation and reverse rotation of the feed roller.

11. The recording apparatus according to claim 9, further comprising:
a display that indicates various information; and
a detection unit that detects opening of the opening/closing body,
wherein the control unit displays, on the display, a user interface suggesting performing the cleaning mode to a user when the opening/closing body is opened with certain conditions satisfied.

12. The recording apparatus according to claim 9, further comprising a display that indicates various information,
wherein the control unit displays, on the display, a user interface suggesting cleaning of the feed roller to a user when a number of medium feed errors from the inclined support portion exceeds a predetermined number.

13. A recording apparatus comprising:
an apparatus body having an inclined support portion that supports a medium in an inclined position, and a feed roller that feeds the medium supported by the inclined support portion;
an opening/closing body that opens and closes an upper part of the apparatus body;
a motor that drives the feed roller; and
a control unit that controls the motor, wherein
the apparatus body has a cover member that covers an upper part of the feed roller and a vicinity thereof,
the cover member has an opening through which the feed roller is exposed, and
the control unit is configured to perform a cleaning mode in which the feed roller is rotated so as not to touch the medium supported by the inclined support portion.

14. A recording apparatus comprising:
an apparatus body having an inclined support portion that supports a medium in an inclined position, and a feed roller that feeds the medium supported by the inclined support portion; and
an opening/closing body that opens and closes an upper part of the apparatus body, wherein
the apparatus body has a cover member that covers an upper part of the feed roller and a vicinity thereof,
the cover member has an opening through which the feed roller is exposed, and
the apparatus body further has a cleaning member configured to be inserted through the opening to clean the feed roller.

* * * * *